United States Patent
Yu et al.

(10) Patent No.: US 9,722,445 B2
(45) Date of Patent: Aug. 1, 2017

(54) CONTROL OF HYBRID ENERGY STORAGE SYSTEM FOR HIGH PULSE LOAD

(71) Applicant: Caterpillar Inc., Peoria, IL (US)

(72) Inventors: Dachuan Yu, Dunlap, IL (US); Gregory J. Speckhart, Peoria, IL (US); Eric Matthew Andris, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 127 days.

(21) Appl. No.: 14/841,216

(22) Filed: Aug. 31, 2015

(65) Prior Publication Data

US 2017/0063124 A1    Mar. 2, 2017

(51) Int. Cl.
*H02J 7/00*    (2006.01)

(52) U.S. Cl.
CPC .................. *H02J 7/0068* (2013.01)

(58) Field of Classification Search
CPC ........... H02J 7/0068; H02M 3/04; H02M 7/04
USPC ........................................................ 320/128
See application file for complete search history.

(56) References Cited

U.S. PATENT DOCUMENTS

| | | | |
|---|---|---|---|
| 3,876,922 A | 4/1975 | Forstbauer | |
| 6,304,006 B1 | 10/2001 | Jungreis | |
| 8,022,572 B2 | 9/2011 | Vyas | |
| 8,860,359 B2 * | 10/2014 | Cao et al. | H01M 10/44 320/103 |
| 9,287,701 B2 * | 3/2016 | Elfman et al. | H02J 1/00 |
| 9,536,205 B2 * | 1/2017 | Ye et al. | G06N 7/02 |
| 2009/0140576 A1 * | 6/2009 | Yu et al. | H02J 3/28 307/66 |
| 2013/0057220 A1 * | 3/2013 | Whitacre | H01M 2/20 320/128 |
| 2014/0103727 A1 | 4/2014 | Taimela et al. | |
| 2014/0339893 A1 | 11/2014 | Votoupal et al. | |
| 2016/0065003 A1 * | 3/2016 | Preston | H02M 7/04 307/64 |

* cited by examiner

*Primary Examiner* — Sun Lin
(74) *Attorney, Agent, or Firm* — Miller, Matthias & Hull

(57) ABSTRACT

A hybrid energy storage system (HESS) and method of controlling a HESS is provided. The HESS comprises a common direct current (DC) bus having a DC bus voltage, an energy storage device electrically coupled to the common DC bus, a power device electrically coupled to the common DC bus, and a controller in operable communication with the energy storage device, the power device and the common DC bus. The controller is configured to, when the energy storage device is charging, increase a power device charging current if an energy storage device charging current is greater than a charging limit for the energy storage device, and when the energy storage device is discharging, increase a power device discharging current if an energy storage device discharging current is greater than a discharging limit for the energy storage device. The HESS can be part of a power system.

20 Claims, 5 Drawing Sheets

CONTROL OF HYBRID ENERGY STORAGE SYSTEM FOR HIGH PULSE LOAD

STATEMENT REGARDING FEDERALLY SPONSORED RESEARCH AND DEVELOPMENT

This invention was made in part with Government support under Contract Number N00014-C-0042 awarded by the Office of Naval Research (ONR). The government may have certain rights in this invention.

TECHNICAL FIELD

The present disclosure generally relates to hybrid energy storage systems (HESSs), and more particularly, to control of a HESS used for support of high pulse load conditions.

BACKGROUND

Historically ship board electrical system and other industrial electrical systems are designed with diesel generator sets in an N+1 fashion. N+1 allows the diesel generator sets to accept typical transient loads that may arise during operation. However, high pulse loads, which draw a very high, short-term, current pulse in an intermittent fashion, pose special challenges to the traditional power supply system. With the advent of modern industrial machinery and modern weaponry on ships (for example, electromagnetic guns, electromagnetic launch systems and free electron lasers), higher power and energy demands may be placed on traditional electrical systems. Traditional electrical systems may not be able to support in a reliable, efficient and cost effective manner such high pulse loads.

U.S. Publication Number 2014/0103727, filed Apr. 17, 2014, (the '727 Application) relates to an island grid power system. The '727 Application describes a power supply system that includes at least one generator coupled an island grid, at least one energy storage unit and at least one converter. The system includes a control circuit configured to cause the converter to transfer power between the energy storage unit and the grid, in response to a change in a load on the island grid, in order to maintain operation of the generator at a predetermined operating point. While such system may be beneficial, a control system that controls charging and discharging prioritization between energy storage devices (for example, batteries) and power devices (for example, ultracapacitors) that substantially support high speed DC loads in an electrical systems is desired.

SUMMARY OF THE DISCLOSURE

In one aspect of the present disclosure, a HESS is disclosed. The HESS may comprise a common DC bus having a DC bus voltage, an energy storage device electrically coupled to the common DC bus, a power device electrically coupled to the common DC bus, and a controller in operable communication with the energy storage device, the power device and the common DC bus. The controller may be configured to, when the energy storage device is charging, increase a power device charging current if an energy storage device charging current is greater than a charging limit for the energy storage device, and when the energy storage device is discharging, increase a power device discharging current if an energy storage device discharging current is greater than a discharging limit for the energy storage device.

In another aspect of the disclosure, a method for controlling a HESS is disclosed. The HESS may include a common DC bus having a DC bus voltage, an energy storage device electrically connected to the common DC bus and a power device electrically connected to the common DC bus. The method may comprise when the energy storage device is charging, increasing a power device charging current if an energy storage device charging current is greater than a charging limit for the energy storage device, and when the energy storage device is discharging, increasing a power device discharging current if an energy storage device discharging current is greater than a discharging limit for the energy storage device.

In yet another aspect of the disclosure, a power system is disclosed. The power system may comprise a HESS and a genset. The HESS may include a common DC bus having a DC bus voltage, at least one battery electrically coupled to a DC load through the common DC bus, a plurality of ultracapacitors electrically coupled to the DC load through the common DC bus and a controller in operable communication with the battery, the plurality of ultracapacitors and the common DC bus. The controller may be configured to, when the battery is charging, increase an ultracapacitor charging current if a battery charging current is greater than a charging limit for the battery and, when the battery is discharging, increase an ultracapacitor discharging current if a battery discharging current is greater than a discharging limit for the battery. The genset may be electrically connected to the common DC bus and configured to charge the battery and the plurality of ultracapacitors.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts, unless otherwise specified.

Figure 1:
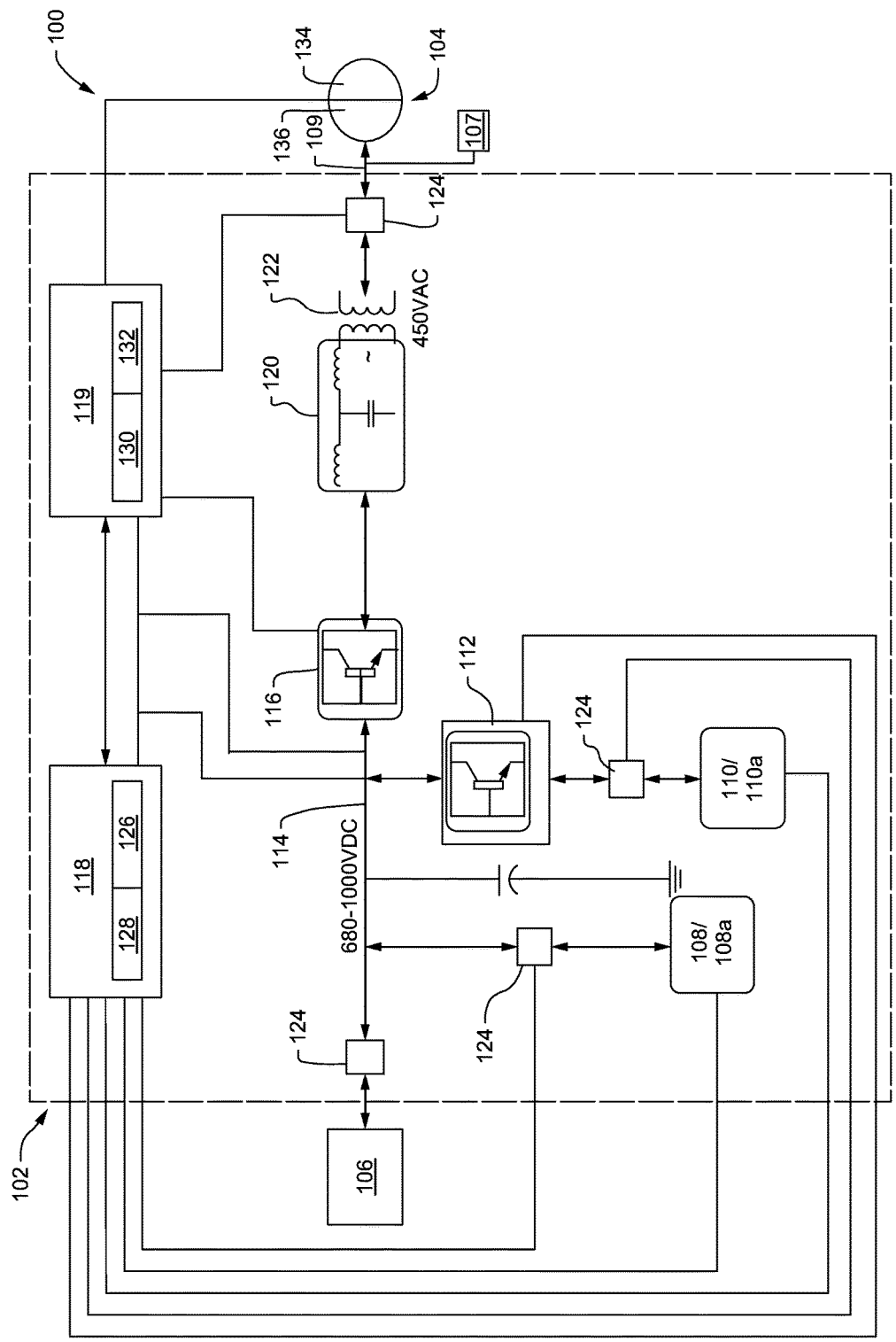
FIG. 1 is a diagrammatic view of one exemplary power system and HESS, according to the present disclosure.

FIG. 1 diagrammatically illustrates an exemplary power system 100. The power system 100 may comprise a HESS 102, a genset 104 and a DC load 106.

One exemplary HESS 102 may include an energy storage device (ESD) 108, a power device 110, one or more bidirectional DC/DC converters (BDCs) 112, a common DC bus 114 and a first controller 118. The HESS 102 may also comprise a second controller 119. In some embodiments, the HESS 102 may further comprise an inverter circuit 116. In an embodiment, the HESS 102 may further comprise a filter 120. In another embodiment the HESS 102 may further comprise a transformer 122. In some embodiments, the HESS 102 may further comprise one or more circuit breakers (CB(s)) 124.

Figure 2:
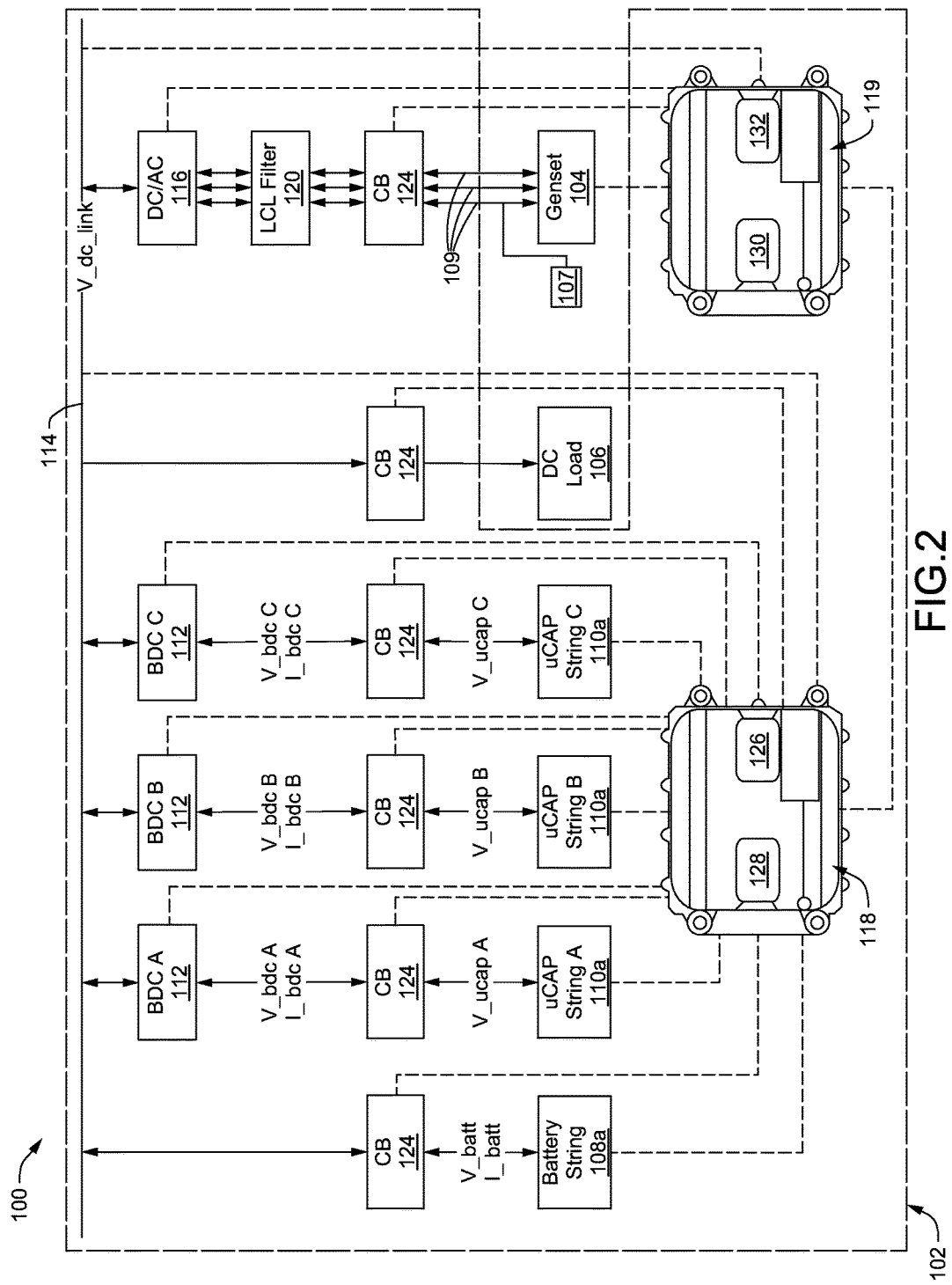
FIG. 2 is a diagrammatic view of one variation of the exemplary power system and HESS of FIG. 1.

The energy storage device 108 may be electrically coupled to the DC load 106 via the common DC bus 114. The energy storage device 108 may be configured to support such a transient DC load 106 via a generally continuous power load level discharge over a time period. The energy storage device 108 may be configured to selectively supply electrical power to the common DC bus 114 to meet or assist in meeting the DC load 106 demand. The energy storage device 108 may be a battery 108a, or the like. In an embodiment, the energy storage device 108 may be a plurality of energy storage devices 108. For example, the plurality of energy storage devices 108 may be a plurality of batteries 108a connected in series (a "string of batteries 108a"). FIG. 2 illustrates an embodiment of the power system 100 and HESS 102 that includes such a string of batteries 108a. In one such embodiment, each battery 108a may be, for example, a lithium iron phosphate (LFP) battery 108a or other energy type of storage devices such as lead acid, Metal Air and flow batteries. In one embodiment, but not necessarily all embodiments, energy storage device 108 (for example, the battery 108a or batteries 108a) may be connected directly to the common DC bus 114.

The power device 110 may be configured to selectively supply supplemental electrical power to the common DC bus 114 to assist the energy storage device 108 or the energy storage device 108 and genset 104 in meeting the DC load 106 intermittent pulse power demand. In one embodiment, power device 110 may be an ultracapacitor 110a, or the like (such as a flywheel). For example, the ultracapacitor 110a may be a low equivalent series resistance (ESR) ultracapacitor 110a. The power device 110 is electrically connected to the DC load 106 through the common DC bus 114. In an embodiment, the power device 110 may be connected to the common DC bus 114 in parallel with the energy storage device 108. In one embodiment, the power device 110 may be electrically connected to the common DC bus 114 via a BDC 112.

In some embodiments, the power device 110 may be a plurality of power devices 110. For example, in one embodiment the power device 110 may be one or more ultracapacitors 110a or one or more arrays or strings of ultracapacitors 110a (see FIG. 2), each array or string of ultracapcitors 110a electrically connected to the common DC bus 114 via a BDC 112. As illustrated in FIG. 2, each combination of an array/string of ultracapacitors 110a and BDC 112 may be connected in parallel with the battery 108a or string of batteries 108a.

In one embodiment, each ultracapacitor 110a may be a high-capacity electrochemical capacitor with capacitance values greater than about 1,000 farads at about 1.2 volts. Such ultracapacitors 110a may typically store 10 to 100 times more energy per unit volume or mass than conventional electrolytic capacitors, and can accept (charge) and deliver charge (discharge) much faster than energy storage devices 108 such as batteries 108a, and tolerate many more charge and discharge cycles than rechargeable batteries 108a.

The HESS 102 may include one or more BDCs 112. Each BDC 112 may be an electronic circuit that converts a source of direct current (DC) from one voltage level to another. In some embodiments, such as those shown in FIGS. 1-2, each BDC 112 electrically connects an ultracapacitor 110a to the common DC bus 114. In such an embodiment, the BDC 112 may convert a first voltage supplied by the ultracapacitor 110a (power device 110) to a second voltage, the second voltage approximating the DC bus voltage, wherein the BDC 112 is disposed between the ultracapacitor 110a (power device 110) and the common DC bus 114.

The common DC bus 114 has a DC bus voltage $V_{dc\_link}$. The common DC bus 114 generally communicates electrical power between each power device 110 and one or more connected DC loads 106, between the energy storage device(s) 108 and one or more connected DC loads 106, and between the genset 104 and one or more connected DC loads 106. The common DC bus 114 also communicates electrical power between the genset 104 and the energy storage device 108 and between the genset 104 and each power device 110. In the embodiment shown in FIGS. 1-2, the common DC bus 114 communicates electrical power between the genset 104 and each power device 110 via a BDC 112.

The inverter circuit 116 is an electronic device or circuitry that is configured to change direct current (DC) to alternating current (AC) and vice versa. The inverter circuit 116 may be disposed between the genset 104 and the common DC bus 114.

The filter 120 may be, for example, a LCL filter or the like that is configured to condition the power sourced to one or more of the high speed DC loads 106 and to smooth current distortion and harmonics, and to condition the power sourced to the genset 104 from the energy storage device 108 during startup. The filter 120 may be disposed between the inverter circuit 116 and the genset 104.

The transformer 122 may be an AC to AC high boost ratio, or the like, configured to boost a first AC voltage, as provided by the genset 104, into a second AC voltage that is different in magnitude than that of the first AC voltage.

Each CB 124 (or contactor 124) may be configured to sense a fault condition in the HESS 102 or the power system 100 and initiate the operation of the circuit breaker or the like to isolate the faulty portion of the power system 100 or HESS 102 from the rest of the power system 100/HESS 102. In one embodiment, such as that shown in FIGS. 1-2, a CB or contactor 124 is disposed between the energy storage device 108 and the common DC bus 114; a CB or contactor 124 is disposed between the DC load 106 and the common DC bus 114; a CB or contactor 124 is disposed between each power device 110 and the BDC 112 or common DC bus 114; and a CB or contactor 124 is disposed between the genset 104 and the transformer 122.

In an embodiment of the power system 100, the HESS 102 may be configured to primarily or solely support the DC load 106. In one embodiment, the HESS 102 may support a transient DC load 106 having intermittent power load spikes (or peaks). To supply such a DC load 106, the HESS 102 may be configured to discharge at a continuous load level during all or most of the time period of the transient DC load 106 and to also (during that time period) support a plurality of intermittent discharge pulses (drawn by the transient DC load 106) over and above the continuous load level.

In one embodiment, each discharge pulse may reach an effective peak discharge power level that is up to about double the maximum continuous (transient) load power. For example, in a scenario where the HESS 102 may be configured to fully discharge at a continuous (transient) load of about −250 kW for a time period of about two (2) to about ten (10) minutes, each discharge pulse may contribute up to about another −250 kW of power to the discharge (from the HESS 102) such that each discharge pulse of the HESS 102 may have an effective peak discharge power level that is in the range of about −250 kW to about −500 kW during the pulse duration. In one embodiment, each discharge pulse may have a pulse duration up to about two (2) seconds.

In some embodiments, the energy storage device 108 may also be utilized to provide power to the AC load 107, when the genset 104 is off or faulty or during initial startup of the genset 104.

When the DC load 106 is reduced or not connected to the power system 100, the genset 104 may be employed to charge the HESS 102. More specifically, when the DC load 106 is reduced or not connected to the power system 100, the genset 104 may be employed to charge the energy storage device 108 and the power device 110. In an embodiment, the genset 104 may be employed to charge the energy storage device 108 from 0% to about 100% state of charge (SOC) in about one (1) hour. In another embodiment, the genset 104 may be employed to charge the energy storage device 108 from 0% to about 100% SOC in about ten (10) to about fifteen (15) minutes.

The first controller 118 may include a first processor 126 and a first memory component 128. As shown best in FIG. 2, the first controller 118 may be operably connected to, or in operable communication with, the energy storage device 108 (or battery string 108a) and may be configured to monitor the operating conditions of the energy storage device 108 such as the energy storage device current $I_{batt}$ (for example, a battery 108a current) and the energy storage device voltage $V_{batt}$ (for example, a battery 108a voltage). When the energy storage device 108 is discharging, the energy storage device current $I_{batt}$ is referred to as the energy storage device discharging current $I_{batt\_disc}$ to clarify that the current is being discharged/emitted from the energy storage device 108. If the energy storage device 108 is a battery 108a, the energy storage device discharging current $I_{batt\_disc}$ may also be referred to as the battery discharging current $I_{batt\_disc}$. When the energy storage device 108 is being charged, the energy storage device current $I_{batt}$ is referred to as the energy storage device charging current $I_{batt\_chg}$ to clarify that the current is being received by and is charging the energy storage device 108. If the energy storage device 108 is a battery 108a, the energy storage device charging current $I_{batt\_chg}$ may also be referred to as the battery charging current $I_{batt\_chg}$.

The first controller 118 may be configured to adjust the power device discharging current $I_D$ based on the value of the energy storage device discharging current $I_{batt\_disc}$ emitted from the energy storage device 108 and to adjust the power device charging current $I_C$ based on the value of the energy storage device charging current $I_{batt\_chg}$ received by the energy storage device 108. If the power device 110 is an ultracapacitor 110a, the power device discharging current $I_D$ may also be referred to as the ultracapacitor discharging current $I_D$, and the power device charging current $I_C$ may also be referred to as the ultracapacitor charging current $I_C$. In an embodiment, the first controller 118 may be configured to provide higher priority in charging the power device 110/110a while respecting the operation constraints from a charging source such as a genset(s) 104.

The first controller 118 may also be adapted to selectively engage the energy storage device 108 to supplement the common DC bus 114 voltage with an adequate DC voltage as needed to support one or more DC loads 106. The first controller may provide for genset 104 soft loading. Soft loading is the feeding in of power from the genset 104 in a controlled manner to support loads and replenish energy storage.

The first controller 118 may be operably connected to, or in operable communication with the power device 110 and configured to monitor operating conditions of the power device 110 such as the power device voltage $V_{ucap}$. The first controller 118 may be operably connected to, or in operable communication with each BDC 112 and may be configured to monitor operating conditions of each BDC 112 such as the BDC voltage $V_{bdc}$ and the BDC current $I_{bdc}$. The first controller 118 may be operably connected to, or in operable communication with each CB 124 and configured to monitor operating conditions of the CB or contactor 124 such as fault conditions.

The first controller 118 may be operably connected to, or in operable communication with each DC load 106 directly, or as shown in FIG. 2 indirectly through a CB 124, and may be configured to monitor the DC load 106 power demand value and changes in such value, the DC load voltage $V_L$ demand value and changes in such value, and the current $I_L$ required to support the DC load 106 and changes in such current draw. The first controller 118 may be operably connected, or in operable communication with the common DC bus 114 and configured to monitor the DC bus voltage $V_{dc\_link}$.

The first processor 126 may be a microcontroller, a digital signal processor (DSP), an electronic control module (ECM), an electronic control unit (ECU), a microprocessor or any other suitable processor as known in the art.

The first processor 126 may execute instructions and generate control signals for, when the energy storage device 108 is charging, increasing a power device charging current $I_C$ if an energy storage device charging current $L_{batt\_chg}$ is greater than a charging limit or threshold for the energy storage device 108. Such charging limit/threshold may be based on a charging limit received from an energy storage management system that actively monitors the health, performance and thermal conditions of the energy storage device 108. For example, the energy storage management system may be a Battery Management System (BMS), or the like, that is disposed within the energy storage device 108, and which actively monitors the health, performance and thermal conditions of all of the battery cells. The first processor 126 may execute instructions and generate control signals for, when the energy storage device 108 is discharging, increasing a power device discharging current $I_D$ if an energy storage device discharging current $I_{batt\_disc}$ is greater than a discharging limit or threshold for the energy storage device 108/108a. Such discharging limit or threshold may be based on a discharging limit from the aforementioned energy storage management system, for example the BMS or the like.

The first processor 126 may execute instructions and generate control signals for discharging the energy storage device 108 to support a transient DC load 106 electrically connected to the common DC bus 114, and for discharging the power device 110 to supplement support of such DC load 106 provided by the energy storage device 108. In one embodiment, the first processor 126 may execute instructions and generate control signals to discharge the energy storage device 108 continuously during the time period of the transient DC load 106 and to discharge the power device 110 intermittently during the time period to support intermittent discharge pulses drawn by the DC load 106. Such instructions may be read into or incorporated into a computer readable medium, such as the memory component 128 or provided external to the processor 126. In alternative embodiments, hard wired circuitry may be used in place of, or in combination with, software instructions to implement a control method.

The second controller 119 may include a second processor 130 and a second memory component 132. The second controller 119 may be communication with the first controller 118. The second controller 119 may be operably connected to, or in operable communication with, the genset 104 and may be configured to monitor operating conditions of the genset 104 such as the operating speed. The second controller 119 may be operably connected, or in operable communication with one or more inverter circuits 116 and configured to monitor the input/output current of each inverter circuit 116. The second controller 119 may also be operably connected, or in operable communication with, a CB 124 disposed between the genset 104 and the HESS 102 and configured to monitor the output voltage of the genset 104 and the input voltage to the HESS 102.

The second processor 130 may be a microcontroller, a digital signal processor (DSP), an electronic control module (ECM), an electronic control unit (ECU), a microprocessor or any other suitable processor as known in the art. The second processor 130 may execute instructions and generate control signals for transmitting operating condition data (for the genset 104) to the first controller 118 and fault condition data for the CB 124 disposed between the genset 104 and the HESS 102, determining the AC load 107, monitoring the inverter circuit 116, and varying the speed of the genset 104 or the spinning reserve level by adjusting the number of gensets 104 online within a genset group 104 (plurality of gensets 104), based on, at least, the AC load 107 or, in some embodiments, instructions from the first controller 118. Such instructions may be read into or incorporated into a computer readable medium, such as the second memory component 132 or provided external to the second processor 130. In alternative embodiments, hard wired circuitry may be used in place of, or in combination with, software instructions to implement a control method.

The term "computer readable medium" as used herein refers to any non-transitory medium or combination of media that participates in providing instructions to the processors 126, 130 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 126, 130 can read.

Each of the first and second controllers 118, 119 is not limited to one processor and memory component. Each controller 118, 119 may be several processors and memory components. In some embodiments, the first and second controllers 118, 119 may be one controller.

In one embodiment, may be configured to retrieve from the first memory component 128 current limits for each BDC 112, a maximum energy storage device 108/108a charging limit/threshold for the energy storage device 108/108a, a maximum energy storage device 108/108a discharging limit/threshold for the energy storage device 108/108a, control gains for the BDC 112, control gains for the energy storage device 108/108a and tunable power system 100 and HESS 102 limits.

The DC load 106 may be one or more high speed transient loads. For example, in one embodiment, the DC load 106 may draw between about 150 kW to about 650 kW power from the power system 100 or the HESS 102 over a time period. In another embodiment, the DC load 106 may draw between about 200 kW to about 600 kW power from the power system 100 or the HESS 102. In an embodiment the time period of the transient DC load 106 may last up to about 20 minutes. In another embodiment, the time period may be between about two (2) minutes to about ten (10) minutes.

The DC load 106 may have a plurality of relatively short intermittent power load spikes (or peaks). In one embodiment, each spike or peak in current draw may have a duration up to about two (2) seconds.

The genset 104 may be electrically connected to the common DC bus 114. The genset 104 may be a fast-response genset 104, or the like. A fast-response genset 104 may be one that provides superior transient capability by utilizing advanced control strategies including faster loop time in a genset controller, transient load relief (TLR) and Load Enhanced Anticipation Control (LEAC).

In one exemplary embodiment the genset 104 may comprise a primary power source 134, and an electric machine 136. The primary power source 134 may be an internal combustion engine or any other comparable prime mover suitable for outputting mechanical energy, such as rotational torque at an output shaft thereof. The electric machine 136 may employ an induction machine, a switched reluctance machine, or any other suitable electric motor or generator known in the art. For example, the electric machine 136 may include a rotor that electromagnetically interacts with and is rotatably disposed within a stator such that, in a generating mode of operation, mechanical or rotational input at the rotor generates electrical energy at an output of the stator. The rotor of the electric machine 136 may be mechanically coupled to the output of the primary power source 134 and the stator may be electrically coupled to the common DC bus 114. In the embodiment illustrated in FIG. 1, the stator of the electric machine 136 of the genset 104 is electrically coupled to an AC bus through the transformer 122.

In an embodiment, the genset 104 may be a variable speed genset (VSG). In typical variable speed gensets 104, the operating speed of the primary power source 134 may be varied according to the load demand. The generator can be coupled to the DC bus 114 via a rectifier or to the AC load 107 and AC bus 109 directly depending on the architecture of VSG. For instance, in order to accommodate an increase in load demand, the engine speed may be increased to increase the electrical power produced by the electric machine 136. Alternately, if the load demand is reduced, the engine speed can be decreased to conserve fuel.

When operating in a generating mode of operation, the primary power source 134 may communicate a rotational torque at the input or rotor of the electric machine 136. As the rotor rotates within the stator of the electric machine 136, electrical power may be generated at the output of the stator and electrically communicated to the HESS 102, more specifically to the common DC bus 114 or AC bus 109 of the HESS 102.

The genset 104 may be configured to charge the energy storage device(s) 108 and power device(s) 110 of the HESS 102. The genset 104 may be configured to support one or more AC loads 107 electrically connected to the genset 104 and, in some embodiments, may be configured to help supply power to transient DC loads 106. While in some embodiments, the genset 104 may be configured to help supply power to transient DC loads 106, due to the limited rotating inertia and delay in engine speed regulation, the transient capability of the genset 104 to source adequate power to high speed DC loads 106 may be limited, especially when the primary power source 134 (for example, an engine) speeds are relatively low. Instead, the HESS 102 alone or the combination of the HESS 102 and the genset 104 may provide the required power to the DC load(s) 106.

Also disclosed is a method of controlling the HESS 102. The method may comprise, when the energy storage device 108 is charging, increasing a power device charging current $I_C$ if an energy storage device charging current $I_{batt\_chg}$ greater than a charging limit for the energy storage device 108/108a and, when the energy storage device 108 is discharging, increasing a power device discharging current $I_D$ if an energy storage device discharging current $I_{batt\_disc}$ is greater than a discharging limit for the energy storage device 108/108a. The method may further comprise discharging the energy storage device 108 to support a DC load 106 electrically connected to the common DC bus 114, and discharging the power device 110 to supplement support of the DC load 106 provided by the energy storage device 108, wherein the DC load 106 draws a plurality of intermittent discharge pulses over a time period, and wherein further the energy storage device 108 is discharged continuously during the time period and the power device 110 is discharged intermittently during the time period to support the intermittent discharge pulses. In some embodiments, each discharge pulse supplied to the DC load 106 by the HESS 102 may have an effective peak discharge power in the range of about −250 kW to about −500 kW and a pulse discharge duration up to about 2 seconds. In a refinement, the time period may be less than about ten minutes. The method may further comprise charging the power device 110 and the energy storage device 108 with a genset 104 electrically connected to the common DC bus 114. The method may also further comprise supporting a DC load 106 electrically connected to the common DC bus 114 by supplementing the energy storage device discharging current $I_{batt\_disc}$ provided by the energy storage device 108 with the power device discharging current $I_D$ provided by the power device 110 and a third discharge current provided by a genset 104 electrically connected to the common DC bus 114.

INDUSTRIAL APPLICABILITY

During low DC and low AC loading events, the power system 100 may pull power out of the genset 104 to charge the energy storage device 108 and the power device 110. The first controller 118 will prioritize the replenishment of the power device 110 over the replenishment of the energy storage device 108.

Upon common DC bus 114 loading, the energy storage device 108 will take the initial loading because the energy storage device 108 is directly connected (via the common DC bus 114) with the DC load 106. In one embodiment, the resulting power draw from the energy storage device 108 is not directly regulated by the controller 118; instead, the current injection from the BDC 112 out of the power device 110 is controlled based on the measured energy storage device discharging current $I_{batt\_disc}$ emitted from the energy storage device 108. The BDC 112 will support the discharge of the energy storage device 108 with energy sourced from the power device 110. The energy storage device 108 may discharge at a lower rate than the power device 110 over the time period of the transient DC loading, whereas the power device 110 may support a plurality of short duration current spikes/peaks drawn by the DC load 106 during such time period. In some embodiments and scenarios, the controller 118 may feed supplemental power in from the genset 104 via the inverter circuit 116 to assist in support of the DC load 106.

In some embodiments in which there is an absence of genset 104 energy, the controller 118/119 may maintain the AC grid and AC loads 107 with the energy storage device 108 via the inverter circuit 116 for a period of time until the energy storage device 108 is fully discharged.

Figure 3:
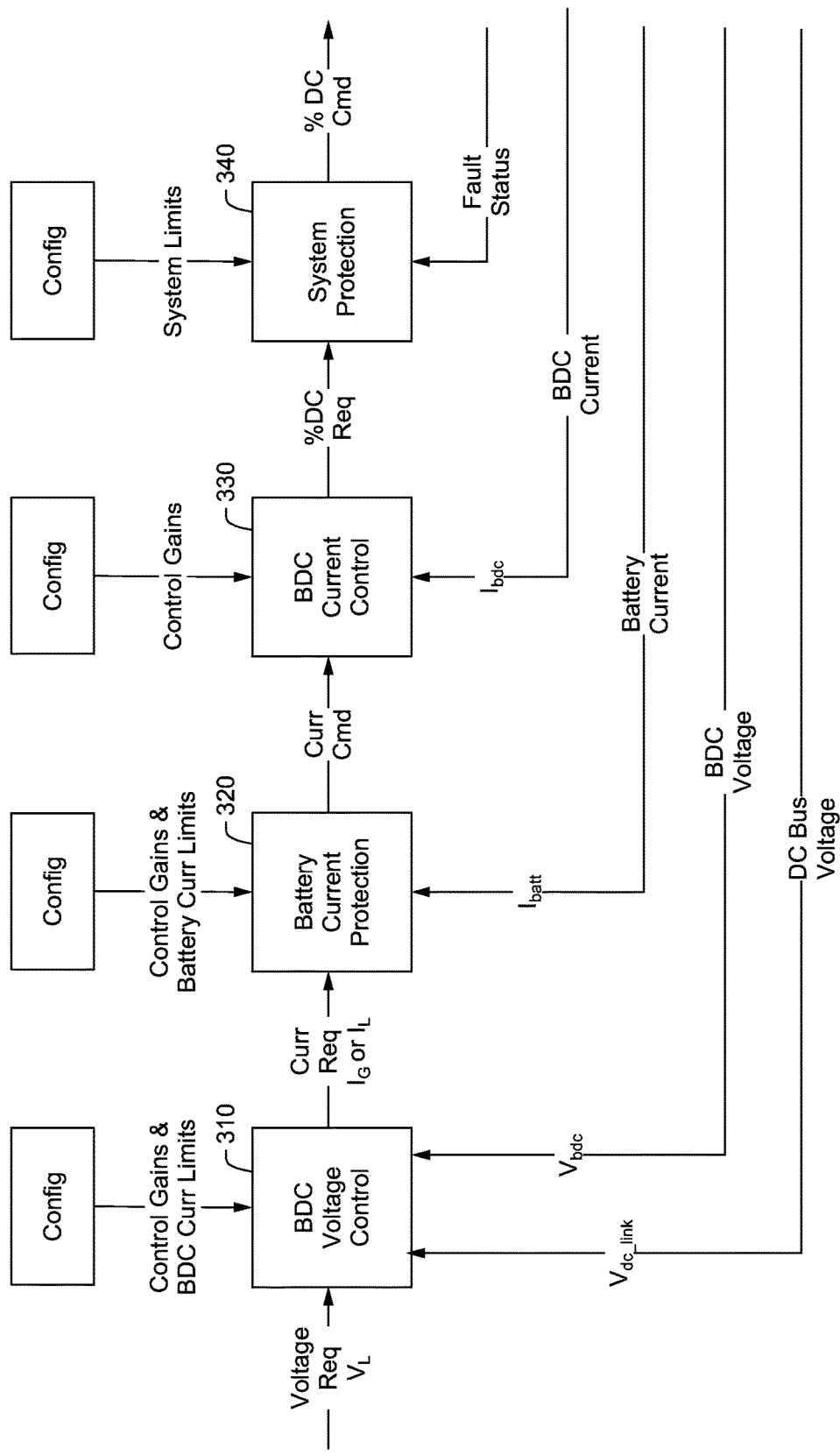
FIG. 3 is a diagrammatic view of a control strategy for a bi-directional converter.
Figure 4:
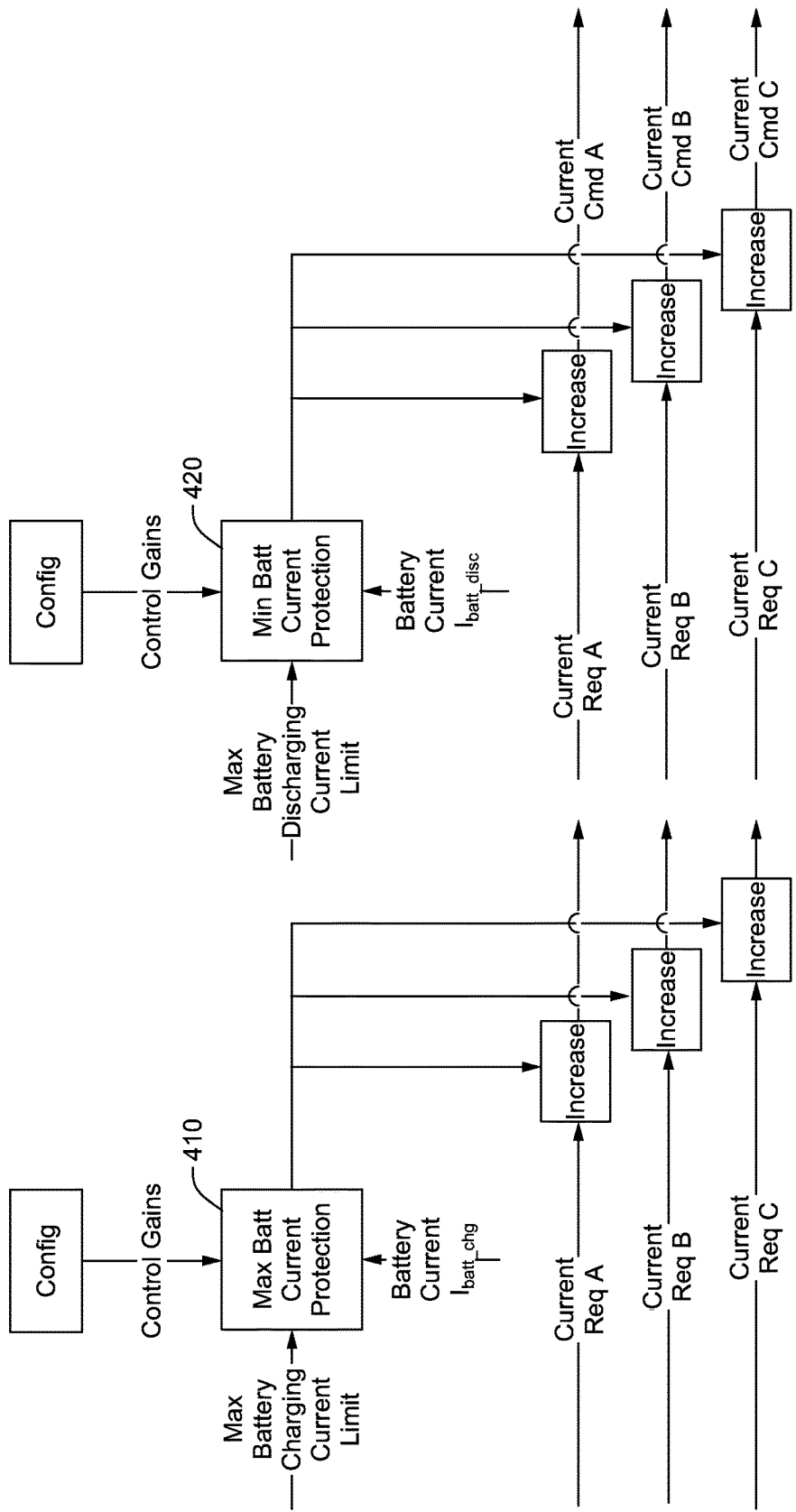
FIG. 4 is a is a diagrammatic view of a control strategy for current sharing in the HESS.

FIG. 3 diagrammatically illustrates a strategy for the control of the exemplary power devices 110 (ultracapacitor strings A, B and C) of FIG. 2. FIG. 4 diagrammatically illustrates a strategy for the prioritization of the charging or discharging of the exemplary energy storage device 108 (battery string) and exemplary power devices 110 (ultracapacitor strings A, B and C) of FIG. 2.

In block 310 of FIG. 3, the first controller 118 may receive a measured voltage request value $V_L$ based on the DC load 106 connected to the common DC bus 114. The first controller 118 may also receive the measured common DC bus voltage $V_{dc\_link}$, and the measured BDC voltage $V_{bdc}$ (at each BDC 112). The first controller 118 may retrieve from the first memory component 128 the BDC current limits and control gains. In block 310, the first controller 118 may determine either the available genset charging current $I_G$ sourced from the genset 104 or the discharge current $I_L$ required to support the DC load 106. (In some cases there may not be a DC load 106 or the DC load 106 may be small enough to permit charging of the energy storage device 108 and power device 110.)

In block 320, the first controller 118 may receive the measured ESD current $I_{batt}$, if any. The first controller 118 may also retrieve from the first memory component 128 the energy storage device current limits (ESD charging limit and ESD discharging limit) and associated control gains. In block 320, the first controller 118 determines whether the BDC 112 should increase the amount of power device charging current $I_C$ flowing to or power device discharging current $I_D$ flowing from each power device 110. More specifically, the first controller 118 may use, in one embodiment, the algorithm of FIG. 5 to determine whether to increase the amount of power device charging current $I_C$ or power device discharging current $I_D$. FIG. 4 diagrammatically illustrates part of the strategy of FIG. 5.

In block 330 of FIG. 3, the first controller 118 receives the measured BDC current $I_{bdc}$ and may also retrieve from the first memory component 128 any BDC 112 control gains. If current to/from each power device 110 is to be increased, the first controller 118 in block 330 determines the provisional percent increase based, at least in part, on the measured BDC current $I_{bdc}$ and any BDC 112 control gains.

In block 340 of FIG. 3, the first controller 118 monitors the CB(s) 124 (or contactors 124), DC bus voltage (level) $V_{dc\_link}$, battery voltage, or the like, for fault status and retrieves from the first memory component 128 any tunable system limits. The first controller 118 determines the final percent increase for the power device charging current $I_C$ flowing to or the power device discharging current $I_D$ based, at least in part, on the provisional percent increase of block 330, the fault status and the power system 100 or HESS 102 limits.

Figure 5:
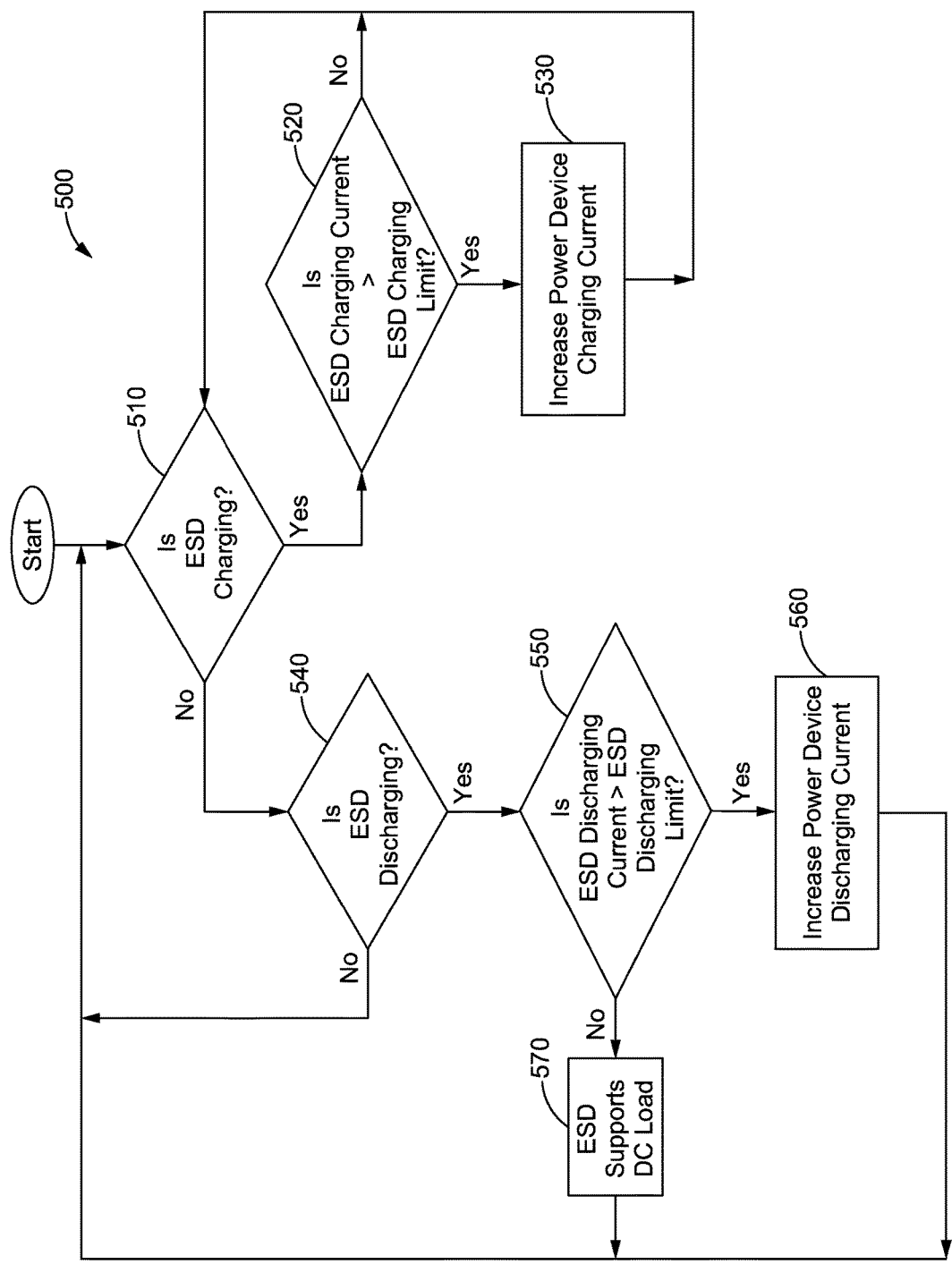
FIG. 5 a flow diagram of one exemplary method of controlling the current sharing in the HESS, according to the present disclosure.

As noted above, the first controller 118 may use, in one embodiment, the exemplary algorithm or method 500 of FIG. 5 to determine whether to increase the amount of the power device charging current $I_C$ flowing to or the power device discharging current $I_D$ flowing from each power device 110/110a.

In block 510 of the method 500, the first controller 118 determines whether the energy storage device 108/108a is charging. If the energy storage device 108/108a is charging, the method 500 proceeds to block 520; if not, the process proceeds to block 540.

In block 520, the first controller 118 may retrieve from the first memory component 128 the maximum energy storage device 108/108a (current) charging limit and any associated control gains. The first controller 118 determines whether the energy storage device charging current $I_{batt\_chg}$ is greater than the maximum energy storage device 108/108a charging limit. If yes, the method 500 proceeds to block 530, if not the method returns to block 510.

In block 530, the first controller 118 increases the power device charging current $I_C$.

In block 540, the first controller 118 determines whether the energy storage device 108/108a is discharging. If yes, the method 500 proceeds to block 550, if not the method 500 returns to block 510.

In block 550, the first controller 118 may retrieve from the first memory component 128, a maximum energy storage device 108/108a (current) discharging limit and any associated control gains. The first controller 118 determines whether the energy storage device discharging current $I_{batt\_disc}$ is greater than the maximum energy storage device 108/108a discharging limit. If yes, the method 500 proceeds to block 560; if not, the process proceeds to block 570.

In block 560, the first controller 118 increases the power device discharging current $I_D$.

In block 570, the energy storage device 108/108a supports the full DC load 106

FIG. 4 also diagrammatically illustrates the general strategy of FIG. 5. In block 410 of FIG. 4, the first controller 118 may receive the measured energy storage device current $I_{BATT}$, if any. If the first controller 118 determines that the energy storage device 108/108a is charging, the first controller 118 may also retrieve from the first memory component 128 the maximum energy storage device 108/108a (current) charging limit and associated control gains.

In block 410, the first controller 118 determines whether the measured energy storage device charging current $I_{batt\_chg}$ is greater than the maximum energy storage device 108/108a charging limit. If yes, the first controller 118 determines that the charging current for each BDC 112 should be increased.

Alternatively, if the first controller 118 determines that the energy storage device 108/108a is discharging, the first controller 118, in block 420, retrieves from the first memory component 128 the maximum energy storage device 108/108a (current) discharging limit and any associated control gains. In block 420, the first controller 118 determines whether the measured energy storage device discharging current $L_{batt\_disc}$ is greater than the maximum energy storage device 108/108a discharging limit. If yes, the first controller 118 determines that the power device 110 discharging current $I_D$ should be increased.

In general, the foregoing disclosure finds utility in various applications relating to power systems 100 and HESS 102 for vehicles, ships and industrial machinery that support transient high-pulse DC loads 106. More specifically, the disclosed systems and methods may be used to provide more efficient control of current sharing during charging and discharging of energy storage devices 108 and power devices 110 in HESS 102, and the like.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A hybrid energy storage system (HESS) comprising:
   a common direct current (DC) bus having a DC bus voltage;
   an energy storage device electrically coupled to the common DC bus;
   a power device electrically coupled to the common DC bus; and
   a controller in operable communication with the energy storage device, the power device and the common DC bus, the controller configured to:
      when the energy storage device is charging, increase a power device charging current if an energy storage device charging current is greater than a charging limit for the energy storage device; and
      when the energy storage device is discharging, increase a power device discharging current if an energy storage device discharging current is greater than a discharging limit for the energy storage device.

2. The HESS of claim 1, wherein the energy storage device is one or more batteries.

3. The HESS of claim 2, wherein power device is one or more ultracapacitors or flywheels.

4. The HESS of claim 3, wherein the controller is further configured to:
   discharge the energy storage device to support a DC load electrically connected to the common DC bus; and
   discharge the power device to supplement support of the DC load provided by the energy storage device,
   wherein the DC load draws a plurality of intermittent discharge pulses over a time period,
   wherein further the energy storage device is discharged continuously during the time period and the power device is discharged intermittently during the time period to support the intermittent discharge pulses.

5. The HESS of claim 3, wherein the controller is further configured to:
   provide a higher priority in charging the power device than the energy storage device.

6. The HESS of claim 1, further comprising a bidirectional DC/DC converter (BDC) that converts a first voltage supplied by the power device to a second voltage, the second voltage approximating the DC bus voltage, wherein the BDC is disposed between the power device and the common DC bus.

7. A method for controlling a hybrid energy storage system (HESS), the HESS including a common direct current (DC) bus having a DC bus voltage, an energy storage device electrically connected to the common DC bus and a power device electrically connected to the common DC bus, the method comprising:
   when the energy storage device is charging, increasing a power device charging current if an energy storage device charging current is greater than a charging limit for the energy storage device; and
   when the energy storage device is discharging, increasing a power device discharging current if an energy storage device discharging current is greater than a discharging limit for the energy storage device.

8. The method according to claim 7, wherein the energy storage device is one or more batteries.

9. The method according to claim 8, wherein power device is one or more ultracapacitors or flywheels.

10. The method according to claim 9, further comprising:
    discharging the energy storage device to support a DC load electrically connected to the common DC bus; and
    discharging the power device to supplement support of the DC load provided by the energy storage device,
    wherein the DC load draws a plurality of intermittent discharge pulses over a time period, wherein further the energy storage device is discharged continuously during the time period and the power device is discharged intermittently during the time period to support the intermittent discharge pulses.

11. The method according to claim 10, wherein each discharge pulse supplied to the DC load by the HESS has an effective peak discharge power in a range of about −250 kW to about −500 kW and a pulse discharge duration up to about 2 seconds.

12. The method according to claim 11, wherein the time period is less than about ten minutes.

13. The method according to claim 10, wherein each discharge pulse supplied to the DC load by the HESS has an effective peak discharge power up to about double a maximum continuous load power supported by the energy storage device.

14. The method according to claim 7, further comprising charging the power device and the energy storage device with a genset electrically connected to the common DC bus.

15. The method according to claim 7, further comprising supporting a DC load electrically connected to the common DC bus by supplementing the energy storage device discharging current with the power device discharging current provided by the power device and a third discharge current provided by a genset electrically connected to the common DC bus.

16. A power system comprising:
a hybrid energy storage system (HESS) including:
  a common direct current (DC) bus having a DC bus voltage;
  at least one battery electrically coupled to a DC load through the common DC bus;
  a plurality of ultracapacitors electrically coupled to the DC load through the common DC bus; and
  a controller in operable communication with said at least one battery, the plurality of ultracapacitors and the common DC bus, the controller configured to:
  when said at least one battery is charging, increase an ultracapacitor charging current if a battery charging current is greater than a charging limit for said at least one battery; and
  when said at least one battery is discharging, increase an ultracapacitor discharging current if a battery discharging current is greater than a discharging limit for said at least one battery; and
a genset electrically connected to the common DC bus and configured to charge said at least one battery and the plurality of ultracapacitors.

17. The power system of claim 16, wherein the controller is further configured to:
discharge the at least one battery to support the DC load; and
discharge the plurality of ultracapacitors to supplement support of the DC load provided by the at least one battery,
wherein the DC load draws a plurality of intermittent discharge pulses over a time period,
wherein further the at least one battery is discharged continuously during the time period and the plurality of ultracapacitors is discharged intermittently during the time period to support the intermittent discharge pulses.

18. The power system of claim 17, wherein the time period is less than about ten minutes and each discharge pulse of the plurality of intermittent discharge pulses supplied to the DC load by the HESS has an effective peak discharge power in a range of about −250 kW to about −500 kW and a pulse discharge duration up to about 2 seconds.

19. The power system of claim 18, wherein each ultracapacitor of said plurality of ultracapacitor supplies to the DC load intermittent discharge pulses having an effective pulse power up to about −250 kW and a discharge duration up to about 2 seconds.

20. The power system of claim 19, wherein the HESS further comprises a bidirectional DC/DC converter (BDC) that converts a first voltage supplied by a first ultracapacitor of the plurality of ultracapacitors to a second voltage, the second voltage approximating the DC bus voltage, wherein the BDC is disposed between the first ultracapacitor and the common DC bus.

\* \* \* \* \*